United States Patent
Zhou

(10) Patent No.: US 12,379,080 B1
(45) Date of Patent: Aug. 5, 2025

(54) OUTDOOR STEP LAMP

(71) Applicant: Xinsheng Zhou, Shenzhen (CN)

(72) Inventor: Xinsheng Zhou, Shenzhen (CN)

(*) Notice: Subject to any disclaimer, the term of this patent is extended or adjusted under 35 U.S.C. 154(b) by 0 days.

(21) Appl. No.: 18/954,658

(22) Filed: Nov. 21, 2024

(30) Foreign Application Priority Data

Oct. 30, 2024 (CN) .......................... 202422636653.0

(51) Int. Cl.
| | |
|---|---|
| F21S 9/03 | (2006.01) |
| E04F 11/104 | (2006.01) |
| F21V 23/00 | (2015.01) |
| F21V 23/04 | (2006.01) |
| F21W 111/027 | (2006.01) |
| F21Y 113/17 | (2016.01) |

(52) U.S. Cl.
CPC ............ *F21S 9/037* (2013.01); *F21V 23/005* (2013.01); *F21V 23/04* (2013.01); *E04F 2011/1048* (2013.01); *F21W 2111/027* (2013.01); *F21Y 2113/17* (2016.08)

(58) Field of Classification Search
CPC .... F21S 9/037; F21S 9/03; F21S 9/032; F21S 9/035; F21W 2111/027; E04F 2011/1048; F21V 33/006; F21V 21/08
See application file for complete search history.

(56) References Cited

U.S. PATENT DOCUMENTS

| | | | | |
|---|---|---|---|---|
| 5,222,799 A | * | 6/1993 | Sears ...................... | F21S 8/037 362/800 |
| 7,934,848 B1 | * | 5/2011 | Pever .................... | F21V 33/006 362/364 |
| 2005/0201091 A1 | * | 9/2005 | Kramer ................. | F21V 33/006 362/249.01 |
| 2009/0296410 A1 | * | 12/2009 | Patti ....................... | F21V 19/04 174/135 |

FOREIGN PATENT DOCUMENTS

| | | | | | |
|---|---|---|---|---|---|
| CN | 110274199 A | * | 9/2019 | ............. | F21S 9/037 |
| CN | 110285377 A | * | 9/2019 | | |

OTHER PUBLICATIONS

Machine translation of CN 110274199 A, to Liu, Hang-Yu, published Sep. 24, 2019 (Year: 2019).*
Machine translation of CN 110285377 A, to Liu, Hang-Yu, published Sep. 27, 2019 (Year: 2019).*

* cited by examiner

*Primary Examiner* — William N Harris
(74) *Attorney, Agent, or Firm* — JEEN IP LAW, LLC

(57) ABSTRACT

Disclosed in the present disclosure is an outdoor step lamp. The outdoor step lamp includes a housing, where an opening is formed at a lower end of the housing, and a cover plate is arranged at the opening of the lower end of the housing. A lamp panel is arranged in the housing, and a control chip and lamp beads that are electrically connected are arranged on the lamp pane. According to the present disclosure, light emitted from the lamp beads is transmitted out through a circular arch top wall, and the light forms a long strip shape that is mapped on a step surface. When the step lamp provided by the present disclosure is mounted on the step, occupied space in a lengthwise direction of a step is small, and impact on walking of people on the step is also minor.

8 Claims, 6 Drawing Sheets

OUTDOOR STEP LAMP

CROSS REFERENCE TO RELATED APPLICATION

This application claims priority benefit of Chinese patent application CN 2024226366530, filed Oct. 30, 2024. The content of the aforementioned application, including any intervening amendments thereto, are incorporated herein by reference.

TECHNICAL FIELD

The present disclosure relates to the field of lighting devices, and in particular to an outdoor step lamp.

BACKGROUND

An outdoor step lamp can provide lighting for steps at night or when light is insufficient, such that people can clearly see the position of each step, thereby effectively avoiding occurrence of accidents such as falling down and spraining ankles due to the fact that people are unable to see the steps clearly.

In daily life, an ordinary step lamp has a small light irradiation area due to a limited mounting height, and people usually set up a plurality of LED lamp beads in the same direction on the outdoor steps to achieve lighting of the steps. Accordingly, when the plurality of step lamps are mounted on the steps, more mounting space is required, and walking of people on the steps is also affected. And therefore, the ordinary step lamp needs to be further improved.

SUMMARY

An objective of the present disclosure is to provide an outdoor step lamp, so as to solve the problems that since an outdoor step lamp in the prior art is long, the step lamp mounted on a step occupies a long space in a lengthwise direction of the step, which affects walking of people on the step.

The present disclosure is implemented as follows: an outdoor step lamp includes a housing. An opening is formed at a lower end of the housing, and a cover plate is arranged at the opening of the lower end of the housing. A lamp panel is arranged in the housing, and a control chip and lamp beads that are electrically connected are arranged on the lamp panel. An opening allowing light of the lamp beads to pass therethrough is arranged at the position, corresponding to the lamp beads, of the cover plate, and a lens lampshade is mounted at the opening. The lens lampshade is made of a transparent or translucent material, and an opening is formed at an upper end of the lens lampshade. The lens lampshade includes a circular arch top wall and side walls arranged at a front side and a rear side of the circular arch top wall, and a thickness of the circular arch top wall is greater than that of the side wall.

Further, a mark through hole is formed in a middle of the circular arch top wall of the lens lampshade.

Further, a step structure protruding downwards is arranged at the opening of the cover plate, and the opening at the upper end of the lens lampshade is arranged on the step structure in a sleeving manner.

Further, the lamp beads are multicolor lamp beads capable of emitting light of various colors.

Further, the cover plate is provided with a switch mounting hole, a switch button is mounted in the switch mounting hole, and the switch button is electrically connected to the lamp panel.

Further, a rear side surface of the housing is of a planar structure, and two mounting grooves spaced apart from each other are formed in the rear side surface.

Further, an inclined wall surface is arranged at an upper end of a front side of the housing, the inclined wall surface is inclined backward from bottom to top, and a solar panel is arranged on the inclined wall surface. A storage battery is mounted in the housing, the solar panel is electrically connected to the storage battery, and the storage battery supplies power to the lamp panel.

Further, two connecting posts are arranged in the housing, threaded holes are arranged at the connecting posts, and the two connecting posts are located at two sides of the opening respectively. Connecting through holes corresponding to the two connecting posts one by one are provided in the cover plate, connecting bolts are mounted in the connecting through holes, and threaded rods of the connecting bolts pass through the connecting through holes and are screwed into the threaded holes of the connecting posts, so as to realize connection between the housing and the cover plate.

Compared with the prior art, the present disclosure has the beneficial effects as follows:

1. The lens lampshade of the present disclosure has the circular arch top wall, the light emitted from the lamp beads is transmitted out through the circular arch top wall, and the light forms a long strip shape that is mapped on a step surface. Therefore, the long strip shape light effect can be realized on a step without needing a greater length of the lamp provided by the present disclosure, occupied space in a lengthwise direction of the step is small when the lamp is mounted on the step, and impact on walking of people on the step is also minor.
2. The present disclosure is provided with the solar panel and the storage battery, and the lamp beads can be powered by the solar panel and the storage battery, which is very convenient to use, and more green and energy-saving.
3. When the lamp provided by the present disclosure is mounted on the step, the solar panel is inclined upwards, such that the solar panel can better face the sun and better absorb sunlight.
4. The lamp beads of the present disclosure are multicolor lamp beads capable of emitting light of multiple colors. By pressing the switch button, the automatic change of the light colors, switching of the light colors, and other operations can be realized, which is very cool.
5. After the lamp provided by the present disclosure is mounted on the step, the lens lampshade and the cover plate face downwards, and the housing is integrally formed, which effectively prevents rainwater from penetrating into the housing, enhances an overall waterproof effect, and is suitable for outdoor use.

In the figures: 1. housing; 101. mounting groove; 102. connecting post; 2. cover plate; 201. opening; 202. step structure; 203. switch mounting hole; 204. connecting through hole; 3. lamp panel; 4. lamp bead; 5. lens lampshade; 501. mark through hole; 6. switch button; and 7. solar panel.

DETAILED DESCRIPTIONS OF THE EMBODIMENTS

In the present disclosure, it should be noted that, unless otherwise explicitly specified and defined, the terms "mounting", "connecting", "connection", "fixing", etc. should be understood in a broad sense, for example, they may denote fixed connection, detachable connection, or integrated connection, denote mechanical connection or electrical connection, denote direct connection or indirect connection via an intermediate medium, or denote communication between interior of two elements or interaction between two elements. The specific meanings of the above terms in the present disclosure may be understood on a case-by-case basis for those of ordinary skill in the art.

A further specification is made below with reference to the accompanying drawings and in conjunction with particular examples:

As shown in FIG. 1, FIG. 2, FIG. 5 and FIG. 6, an outdoor step lamp includes a housing 1 and a cover plate 2. The housing 1 is of an integrated molded structure, an opening is formed at a lower end of the housing 1, and the cover plate 2 is mounted at the opening of the lower end of the housing 1. Two connecting posts 102 that are spaced apart from each other are arranged in the housing 1, and threaded holes are provided in the connecting posts 102. Connecting through holes 204 corresponding to the two connecting posts 102 one by one are provided in the cover plate 2, connecting bolts are mounted in the connecting through holes 204, and threaded rods of the connecting bolts pass through the connecting through holes 204 and are screwed into the threaded holes of the connecting posts 102, so as to realize connection between the housing 1 and the cover plate 2.

Figure 1:
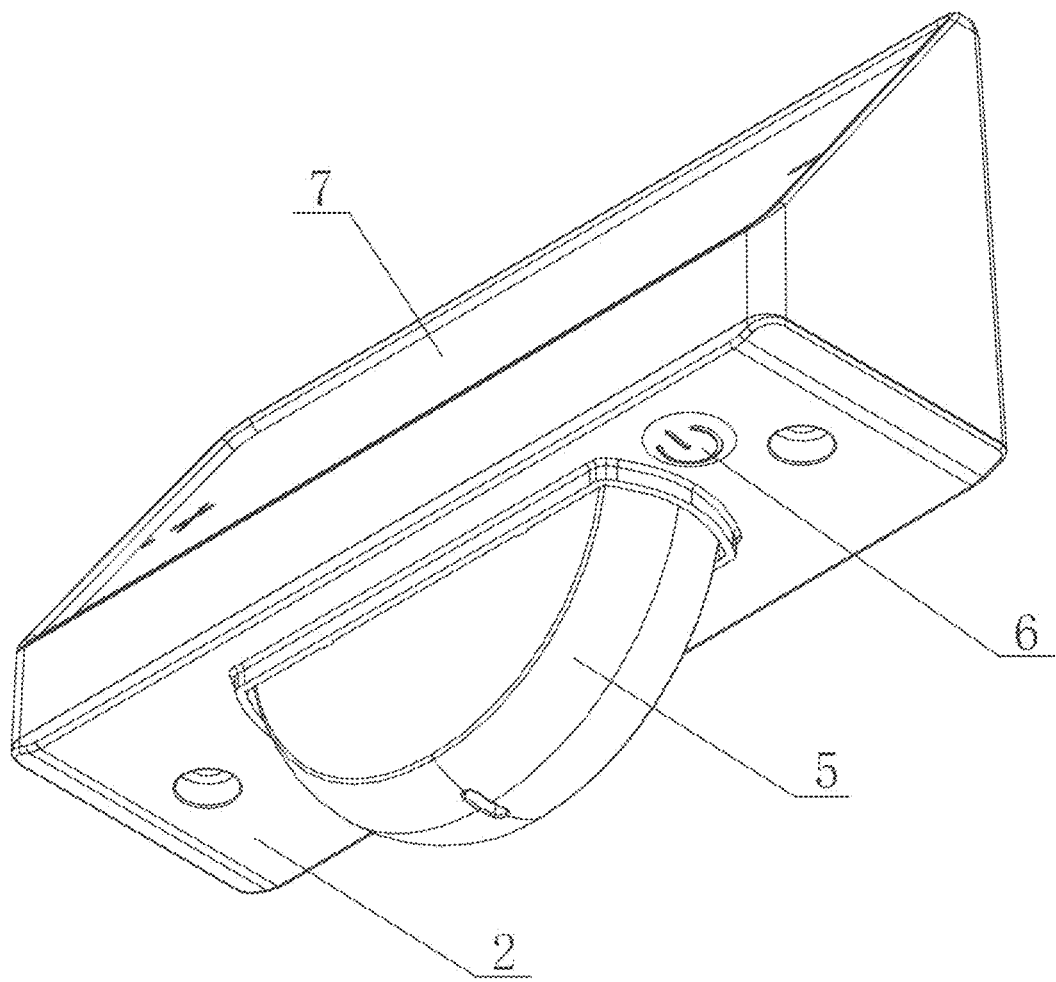
FIG. 1 is a perspective schematic structural diagram from a front view of the present disclosure.
Figure 2:
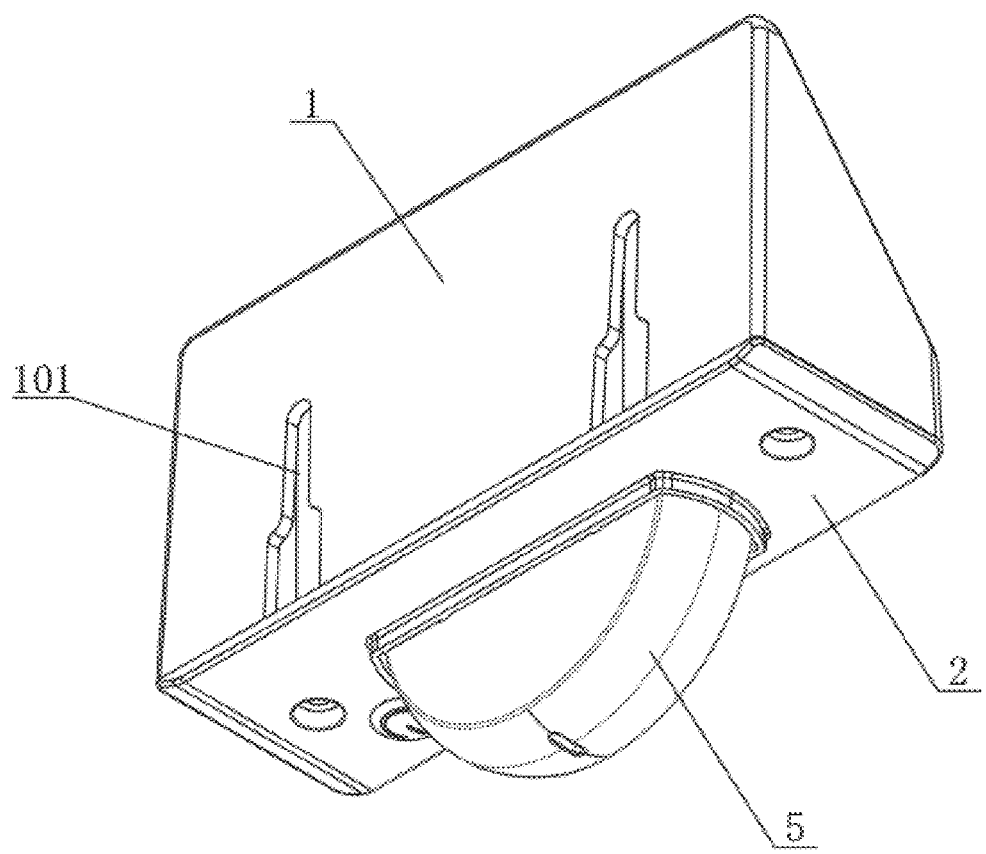
FIG. 2 is a perspective schematic structural diagram from a rear view of the present disclosure.
Figure 3:
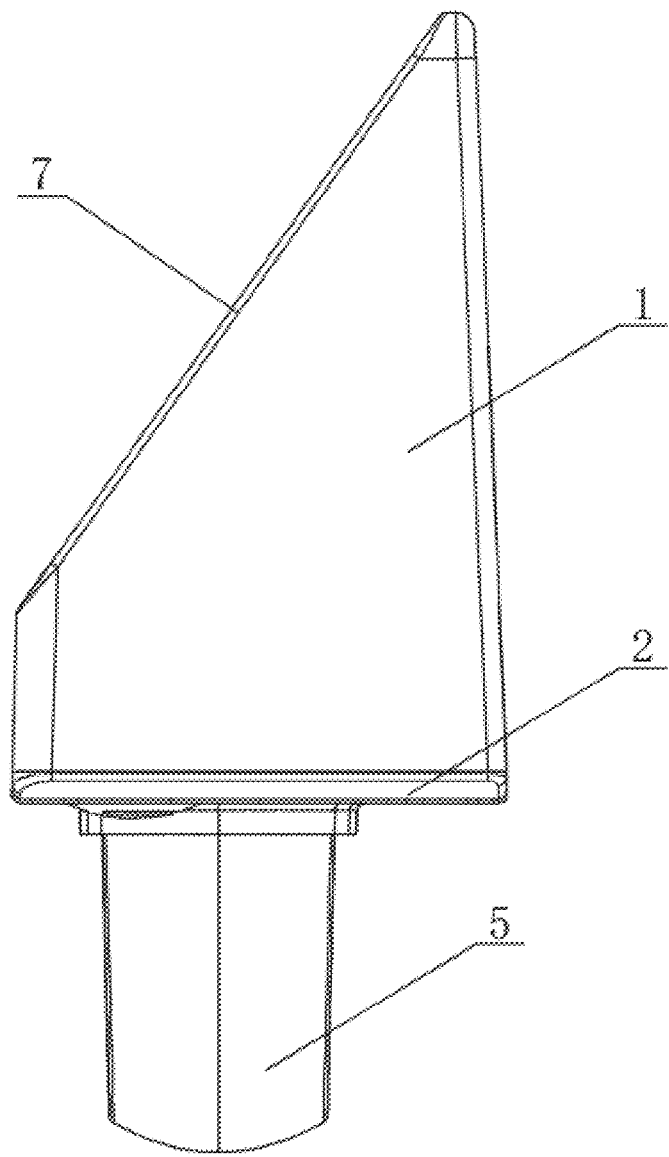
FIG. 3 is a side view of the present disclosure.

As shown in FIGS. 1-3, a rear side surface of the housing 1 is of a planar structure, and two mounting grooves 101 spaced apart from each other are formed in the rear side surface. There are two ways of mounting the housing 1 on a step, one is to stick the housing on a vertical surface of the step through glue, and the other is to punch holes in the vertical surface of the step and carry out mounting through screws, and then, the housing is clamped on nuts of the screws through mounting grooves 101. An inclined wall surface is arranged at an upper end of a front side of the housing 1, the inclined wall surface is inclined backward from bottom to top, and a solar panel 7 is arranged on the inclined wall surface. A storage battery is mounted in the housing 1, and the solar panel 7 is electrically connected to the storage battery. Solar energy is converted into electric energy by the solar panel 7, and the electric energy is stored in the storage battery. When the lamp provided by the present disclosure is mounted on the step, the solar panel 7 is inclined upwards, such that the solar panel 7 can better face the sun and better absorb sunlight.

Figure 4:
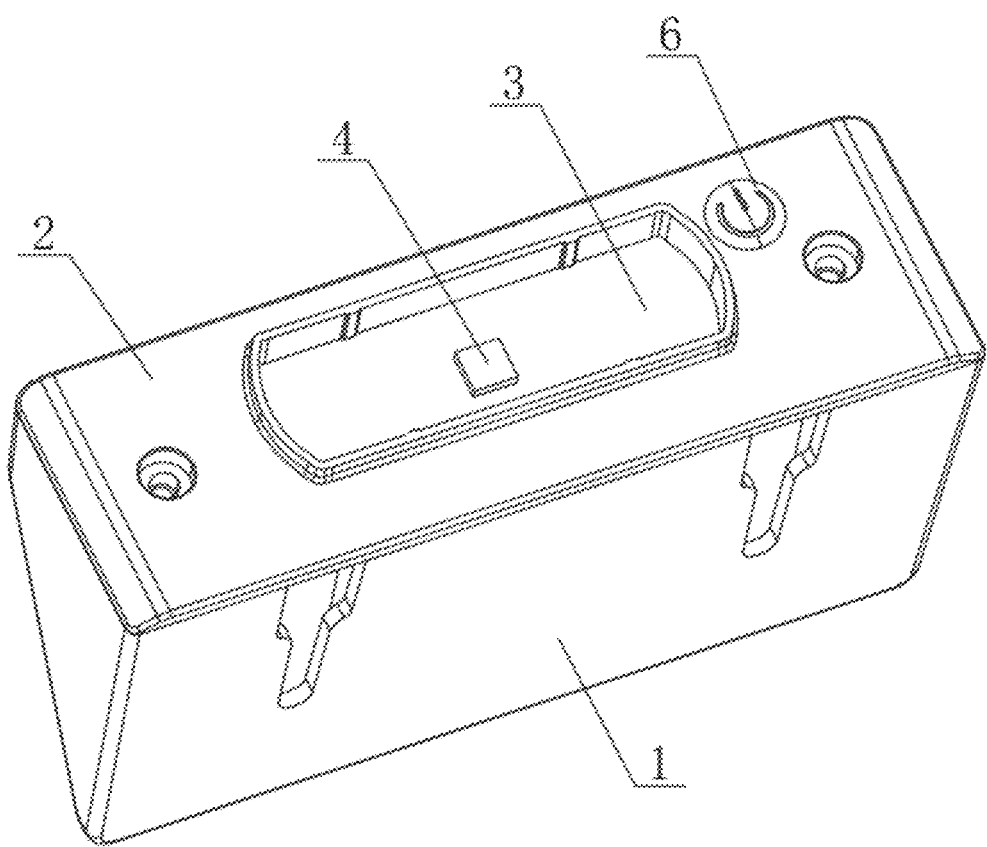
FIG. 4 is a perspective schematic structural diagram of the present disclosure in the case of removing a lens lampshade.
Figure 5:
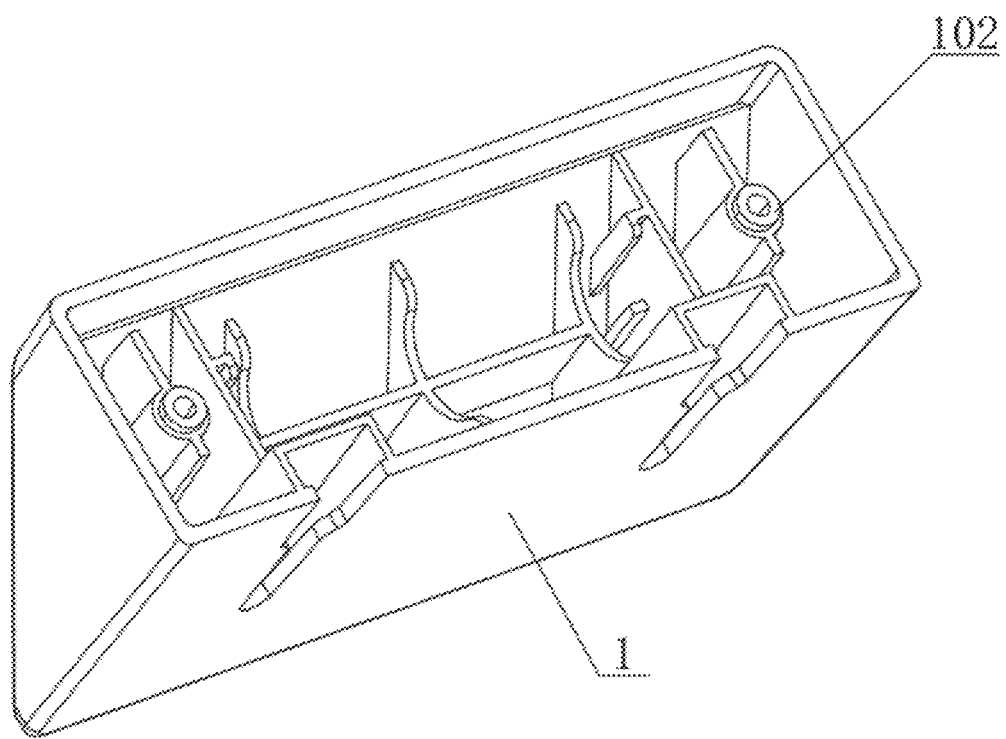
FIG. 5 is a perspective schematic structural diagram of a housing of the present disclosure.
Figure 6:
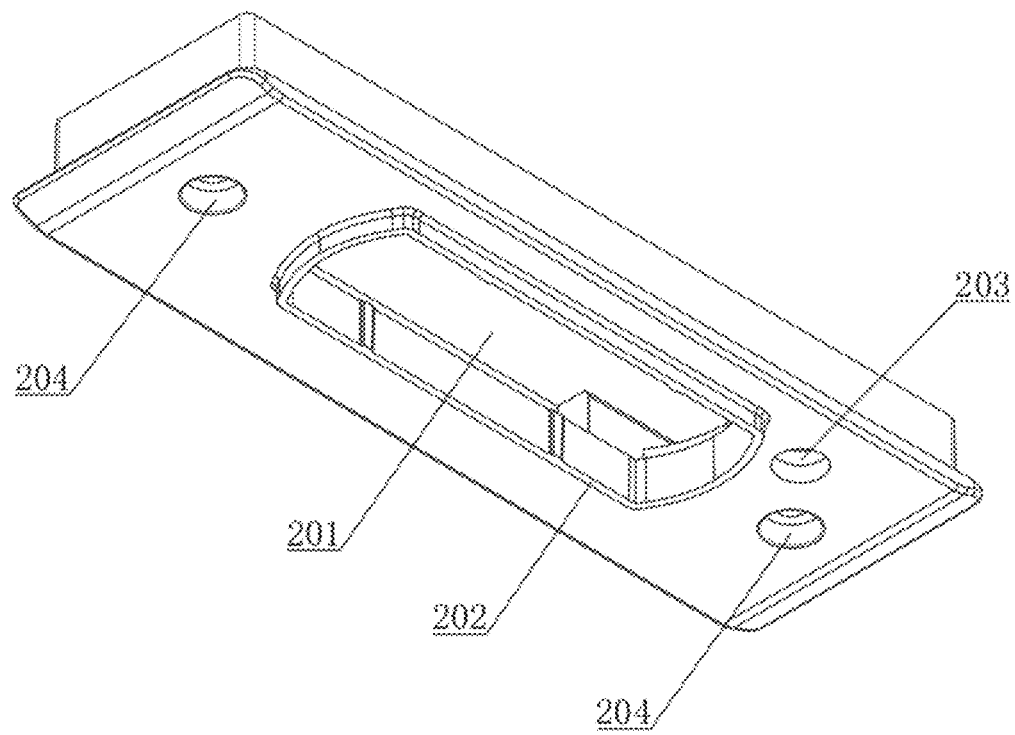
FIG. 6 is a perspective schematic structural diagram of a cover plate of the present disclosure.

As shown in FIG. 1, FIG. 4 and FIG. 6, a lamp panel 3 is arranged in the housing 1, and the storage battery supplies power to the lamp panel 3. A control chip and lamp beads 4 that are electrically connected are arranged on the lamp panel 3, the lamp beads 4 are multicolor lamp beads capable of emitting light of various colors, and one or more lamp beads 4 are arranged. The cover plate 2 is provided with a switch mounting hole 203, a switch button 6 is mounted in the switch mounting hole 203, and the switch button 6 is electrically connected to the lamp panel 3. By pressing the switch button 6, the automatic change of the light colors, switching of the light colors, and other operations can be realized, which is very cool. An opening 201 allowing light of the lamp beads 4 to pass therethrough is arranged at the position, corresponding to the lamp beads 4, of the cover plate 2, and a lens lampshade 5 is mounted at the opening 201. The lens lampshade 5 is made of a transparent or translucent material, and an opening is formed at an upper end of the lens lampshade 5. The lens lampshade 5 includes a circular arch top wall and side walls arranged at a front side and a rear side of the circular arch top wall, and a thickness of the circular arch top wall is greater than that of the side wall. Thus, a lens effect of the lens lampshade 5 can be formed, light emitted from the lamp beads 4 is transmitted out through the circular arch top wall, the light forms a long strip shape that is mapped on a step surface, and the maximum length of the light can reach 120 CM, such that the step can be conveniently lighted, and a user can conveniently walk at night.

Figure 7:
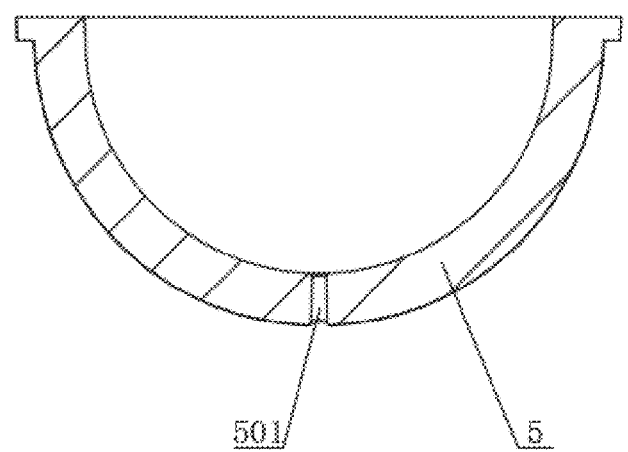
FIG. 7 is a sectional view of a lens lampshade of the present disclosure.

As shown in FIG. 1, FIG. 6 and FIG. 7, a step structure 202 protruding downwards is arranged at the opening of the cover plate 2, and the opening at the upper end of the lens lampshade 5 is arranged on the step structure 202 in a sleeving manner. A mark through hole 501 is formed in a middle of the circular arch top wall of the lens lampshade 5, and the mark through hole 501 can be in various shapes such as a straight line shape, a quincunx shape, a circle shape, a diamond shape, and a heart shape. The light emitted from the lamp beads 4 can be mapped to form the light effect in the shape of the mark through hole 501 on the ground through the mark through hole 501, such that customization can be made according to personalized requirements of users and satisfies the personalized requirements of the users.

To sum up, the lamp beads 4 and the lens lampshade 5 are arranged in the present disclosure, the lens lampshade 5 has the circular arch top wall, the light emitted from the lamp beads 4 is transmitted out through the circular arch top wall, and the light forms the long strip shape that is mapped on the step surface. Therefore, the long strip shape light effect can be realized on the step without needing a greater length of the lamp provided by the present disclosure, occupied space in a lengthwise direction of the step is small when the lamp is mounted on the step, and impact on walking of people on the step is also minor.

In addition, the lamp provided by the present disclosure is not merely limited to use on the step and can also be mounted an outdoor wall for use.

The foregoing are merely the preferred embodiments of the present disclosure and are not intended to limit the present disclosure, and various modifications and changes may be made by those skilled in the art. Any modifications, equivalent replacements, improvements, etc. made within the spirit and principles of the present disclosure should fall within the scope of protection of the present disclosure.

What is claimed is:

1. An outdoor step lamp, comprising a housing, wherein an opening is formed at a lower end of the housing, and a cover plate is arranged at the opening of the lower end of the housing;

a lamp panel is arranged in the housing, and a control chip and lamp beads that are electrically connected are arranged on the lamp panel; and an opening allowing light of the lamp beads to pass therethrough is arranged at a position on the cover plate corresponding to the lamp beads, a lens lampshade is mounted at the opening of the cover plate, the lens lampshade is made of a transparent or translucent material, an opening is formed at an upper end of the lens lampshade, the lens lampshade comprises a circular arch top wall and side walls arranged at a front side and a rear side of the circular arch top wall, and a thickness of the circular arch top wall is greater than that of the side walls.

2. The outdoor step lamp according to claim 1, wherein a mark through hole is formed in a middle of the circular arch top wall of the lens lampshade.

3. The outdoor step lamp according to claim 1, wherein a step structure protruding downwards is arranged at the opening of the cover plate, and the opening at the upper end of the lens lampshade is arranged on the step structure in a sleeving manner.

4. The outdoor step lamp according to claim 1, wherein the lamp beads are multicolor lamp beads capable of emitting light of various colors.

5. The outdoor step lamp according to claim 1, wherein the cover plate is provided with a switch mounting bole, a switch button is mounted in the switch mounting hole, and the switch button is electrically connected to the lamp panel.

6. The outdoor step lamp according to claim 1, wherein a rear side surface of the housing is a planar structure, and two mounting grooves spaced apart from each other are formed in the rear side surface.

7. The outdoor step lamp according to claim 1, wherein an inclined wall surface is arranged at an upper end of a front side of the housing, the inclined wall surface is inclined backward from bottom to top, a solar panel is arranged on the inclined wall surface, a storage battery is mounted in the housing, the solar panel is electrically connected to the storage battery, and the storage battery supplies power to the lamp panel.

8. The outdoor step lamp according to claim 1, wherein two connecting posts are arranged in the housing, threaded holes are arranged at the connecting posts, and the two connecting posts are located at two sides of the opening at the lower end of the housing respectively; and connecting through holes corresponding to the two connecting posts one by one are provided in the cover plate, connecting bolts are mounted in the connecting through holes, and threaded rods of the connecting bolts pass through the connecting through holes and are screwed into the threaded holes of the connecting posts, so as to realize connection between the housing and the cover plate.

* * * * *